US005805363A

United States Patent [19]

Okuda et al.

[11] Patent Number: 5,805,363

[45] Date of Patent: Sep. 8, 1998

[54] COLLIMATING LENS UNIT

[75] Inventors: Isao Okuda; Toshiyuki Kase; Hiroshi Nishikawa, all of Tokyo, Japan

[73] Assignee: Asahi Kogaku Kogyo Kabushiki Kaisha, Tokyo, Japan

[21] Appl. No.: 895,815

[22] Filed: Jul. 17, 1997

[30] Foreign Application Priority Data

Jul. 18, 1996 [JP] Japan .................................... 8-189178

[51] Int. Cl.[6] ........................................................ G02B 7/02

[52] U.S. Cl. ........................... 359/819; 359/800; 369/100

[58] Field of Search ..................................... 359/799, 819, 359/811, 820, 800; 369/99, 100

[56] References Cited

U.S. PATENT DOCUMENTS

| | | | |
|---|---|---|---|
| 4,886,342 | 12/1989 | Kuda et al. | 359/819 |
| 5,161,061 | 11/1992 | Ihara et al. | 359/819 |
| 5,381,190 | 1/1995 | Rehse et al. | 359/819 |
| 5,612,826 | 3/1997 | Ohshita | 359/819 |

*Primary Examiner*—Loha Ben

*Attorney, Agent, or Firm*—Greenblum & Bernstein, P.L.C.

[57] ABSTRACT

A collimating lens unit is provided that includes a collimating lens, a lens holder which holds the collimating lens, and an adhesive which secures the collimating lens to the lens holder. The adhesive is applied to remain outside of an effective area of the collimating lens, so that an output beam emitted from the collimating lens unit is not shaded by the adhesive. In particular, the effective area is determined based on the characteristics of an optical system which includes the collimating lens.

20 Claims, 4 Drawing Sheets

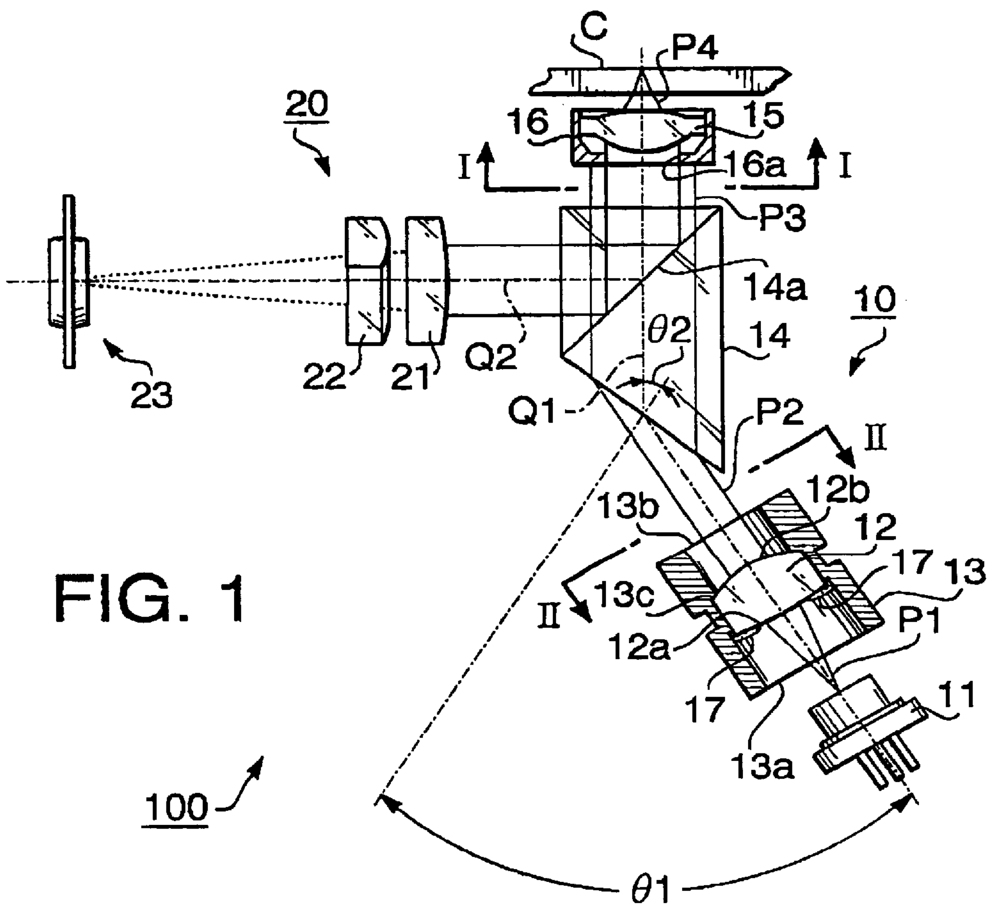
FIG. 1
FIG. 2
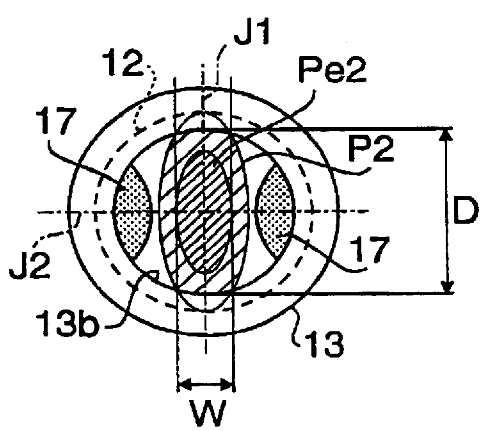

COLLIMATING LENS UNIT

BACKGROUND OF THE INVENTION

The present invention relates to a collimating lens unit for collimating a light beam used, for example, in an optical data recording and/or reproducing apparatus.

An optical data recording and/or reproducing apparatus typically includes an optical head provided with a light source and a collimating lens unit. The collimating lens unit includes a collimating lens and a lens holder which holds the collimating lens. The light source emits a light beam that is collimated by the collimating lens to a parallel light beam. The parallel light beam is emitted from the optical head towards a recording medium such as an optical disk.

Generally, the lens holder is substantially cylindrical having an incident aperture and an emission aperture. The collimating lens is secured inside the lens holder between the incident aperture. and the emission aperture. In one example of a conventional lens holder, a stepped portion is provided between the incident aperture and the emission aperture on an inner surface of the lens holder. A periphery of the collimating lens is abutted against the stepped portion, and a fixing element, for example, an adhesive agent, is applied to the collimating lens and the lens holder at a point of contact between the collimating lens and the lens holder to fix the collimating lens in the lens holder.

However, a problem arises in that portions of the beam emitted by the light source and collimated by the collimating lens may often be shaded by the fixing element, which may affect the quality of the recording and/or reproducing operation.

SUMMARY OF THE INVENTION

It is therefore an object of the present invention to provide an improved collimating lens unit for collimating a light beam, in which a fixing element, used to secure a collimating lens in a lens holder does not affect the quality of the recording and/or reproducing operation.

According to one aspect of the invention, there is provided a collimating lens unit for use in an optical system. The collimating lens unit includes; a collimating lens, a lens holder that holds the collimating lens, and a fixing element for fixing the collimating lens to the lens holder. In particular, the collimating lens receives a light beam and collimates the light beam into a parallel beam and the optical system defines an effective portion of the light beam collimated by the collimating lens. Further, the fixing element acts on the collimating lens outside of an effective area corresponding to the effective portion.

With this structure of the collimating lens unit, the effective portion of the beam which contributes to recording and/or reproducing of data is not shaded by the fixing element.

In a particular case, the light beam may have an elliptical cross section such that the effective portion of the light beam corresponds to an elliptical area on a surface of the collimating lens.

If the light beam incident to an incident surface of the collimating lens is elliptical, it is relatively easy to make the fixing element act on an area outside of the elliptical area.

Preferably, the fixing element acts outside of the elliptical area, and substantially on a minor axis of the elliptical area. Since there is more space on the minor axis of the elliptical area, in this case, it may be easier to apply the fixing element to the collimating lens.

Alternatively, it may be possible that the fixing element acts outside of a region, centered on a major axis of the elliptical area and having a predetermined width.

Further, the fixing element can act at positions substantially 45 degrees from a major axis of the elliptical area.

In another particular case, the fixing element may act on an incident surface of the collimating lens, or alternatively on an emission surface of the collimating lens.

Further, since, a size of a beam incident on the collimating lens is generally smaller than a size of a beam emitted from the collimating lens, it may be preferable that the effective area is defined at an incident surface of the collimating lens.

According to another aspect of the invention, there is provided an optical head for use in an optical data recording and/or reproducing system to emit a light beam having a predetermined cross-sectional shape. The optical head includes: a light source which emits a light beam; a collimating lens which receives the light beam and collimates the light beam into a parallel beam; a beam-shaping element which adjusts a shape of the parallel beam emitted from the collimating lens to form a beam-shaped beam; and an objective lens which receives a portion of the beam-shaped beam and focuses the portion of the beam-shaped beam onto an objective surface, wherein the portion of the beam-shaped shaped beam received by the objective lens defines an effective portion of the beam-shaped beam. The optical head may further include a lens holder that holds the collimating lens and a fixing element which fixedly secures the collimating lens in the lens holder. In particular, the fixing element may act on the collimating lens outside of an effective area, which corresponds to the effective portion of the beam-shaped beam.

With this structure, at least an effective portion of the parallel beam is not shaded, and accordingly the fixing element does not affect the operation of the optical head.

In a particular case, the light beam emitted by the light source may have an elliptical cross section defining a major and minor axes, and the effective area will also have an elliptical shape positioned on the major axis and the minor axis.

Further, in this case, a beam-shaping prism may magnify the parallel beam collimated by the collimating lens only in a direction parallel to the minor axis. In this case, since the effective portion of the parallel beam is not shaded by the fixing element, even if the parallel beam is magnified, the fixing element does not affect the operation of the optical head.

Preferably, the fixing element acts outside of the effective area along the minor axis direction. Alternatively (or optionally), the fixing element may act at positions 45 degrees from the major axis. It should be noted that, as long as the fixing element is outside the effective area, the fixing element can be applied in a variety of configurations.

In each of the above aspects and particular cases, the fixing element may be an adhesive agent.

BRIEF DESCRIPTION OF THE DRAWINGS

FIG. 1 is a plan view of an optical pick-up device to which an embodiment of the invention is applied;

FIG. 2 is a schematic view taken along line II—II of FIG. 1, illustrating a relationship between a parallel light beam and an adhesive applied to a collimating lens;

DETAILED DESCRIPTION OF THE PREFERRED EMBODIMENT

Figure 3:
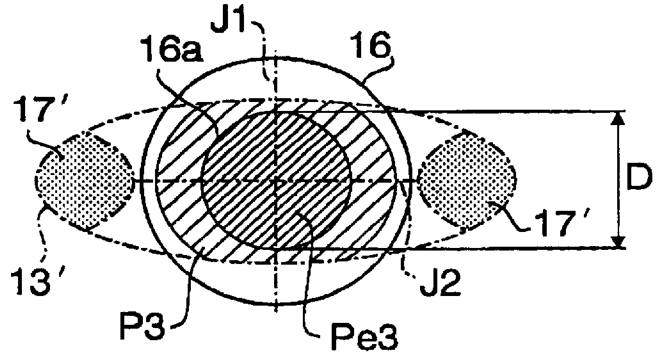
FIG. 3 is a schematic view taken along line I—I of FIG. 1, illustrating a relationship between the parallel light beam of FIG. 2 and an effective region of an objective lens.

A preferred embodiment of a collimating lens unit is described as applied to an optical pick-up device 100 which may be employed, for example in an optical data recording and/or reproducing apparatus.

FIG. 1 is a plan view of the optical pick-up device 100.

The optical pick-up device 100 includes a lighting portion 10 and a detection portion 20. The lighting portion 10 and the detection portion 20 define optical axes Q1 and Q2, respectively.

The lighting portion 10 includes a laser diode 11, a collimating lens 12, a lens holder 13 that supports the collimating lens 12, a beam-shaping prism 14, an objective lens 15, and a holding frame 16 that supports the objective lens 15.

The laser diode 11 emits a light beam P1, the collimating lens 12 collimates the light beam P1 into a parallel beam P2, the beam-shaping prism 14 shapes the parallel beam P2 into a shaped parallel beam P3, and the objective lens 15 focuses the shaped parallel beam P3 to form a focused beam P4 directed to a recording medium C.

The detection portion 20 includes the objective lens 15, a beam splitter 14a of the beam-shaping prism 14, a detecting lens 21, a cylindrical lens 22, and a photodiode 23.

The focused beam P4 is reflected by the recording medium C, passes through the objective lens 15, is reflected by the beam splitter 14*a*, and is then converged and focused by the detective lens 21 and the cylindrical lens 22 onto the photodiode 23.

FIG. 2 is a schematic view of an emission surface 12*b* of the collimating lens 12, illustrating the cross-sectional shape of the parallel beam P2 taken along the line II—II of FIG. 1. A cross-sectional shape of the beam emitted by the laser diode 11 is elliptical, and accordingly, as shown in FIG. 2, the parallel beam P2 which is collimated by the collimating lens 12 has an elliptical cross-section defining a major axis direction J1 and a minor axis direction J2. In the view of FIG. 1, the major axis direction J1 is normal to the page of the drawing.

Referring to FIGS. 1 and 2, the lens holder 13 is substantially cylindrical and includes an incident aperture 13*a*, an emission aperture 13*b*, and an inner flange 13*c* between the incident aperture 13*a* and the emission aperture 13*b*.

The peripheral portion of the emission surface 12*b* of the collimating lens 12 is abutted against the inner flange 13*c* and a fixing element, in this case, an adhesive agent 17, is applied to predetermined locations on an incident surface 12*a* of the collimating lens 12 to secure the collimating lens 12 in the lens holder 13. Alternatively, the incident surface 12*a* of the collimating lens 12 may be abutted against the inner flange 13*c* and the adhesive agent 17 applied accordingly. Further, in this embodiment, the adhesive agent is a UV (Ultraviolet) hardening adhesive agent, that is, the adhesive agent 17 initially has a predetermined viscosity but, when illuminated with UV light, hardens.

As shown in FIG. 1, the parallel beam P2 emitted from the collimating lens 12 is incident on the beam-shaping prism 14 with an angle of incidence θ1 and is refracted at an angle of refraction θ2. The beam-shaping prism 14 magnifies the minor axis direction J2 of the parallel beam P2 to produce the shaped parallel beam P3. A magnification M of the beam-shaping prism 14 is defined by:

$$M=\cos\theta 2/\cos\theta 1,$$

where $$n1*\sin\theta 1=n2*\sin\theta 2,$$

where n1 and n2 are refractive indexes. In the embodiment, n1 ≈1 for air and n2=1.51 for optical glass.

FIG. 3 is a schematic view of an incident side of the holding frame 16 and the objective lens 15, illustrating the cross-sectional shape of the shaped parallel beam P3 when incident on the holding frame 16. In FIG. 3, an imaginary image of the emission aperture 13*b* of the lens holder 13, as shaped by the beam-shaping prism 14, is shown by phantom line 13' and similarly, an imaginary image of the adhesive agent 17, as shaped by the beam-shaping prism 14, is shown by phantom line 17'.

As shown in FIG. 3, the holding frame 16 includes an incident aperture 16*a*. In the optical pick-up device 100, depending on the required size of a beam spot (not shown) at the recording medium C, various values for optical elements in the optical system are determined. For example, for an objective lens 15 having a predetermined magnification, the size of the incident aperture 16*a* is determined in accordance with the required size of the beam spot. In this embodiment, the incident aperture 16*a* is designed to form an appropriate beam spot and, further, the lighting portion 10 is designed such that the incident aperture 16*a* admits only a predetermined portion of the shaped parallel beam P3 to the objective lens 15. Thus, the incident aperture 16*a* defines a shaped effective beam P3 representing the portion of the shaped parallel beam P3 that is admitted to the objective lens 15. By extrapolating backward, i.e., to the beam shaping prism 14 and the collimating lens 12, the incident aperture 16*a* also defines a parallel effective beam Pe2 (shown in FIG. 2), representing a portion of the parallel beam P2 which will be transmitted to the objective lens 15. In other words, only the parallel effective beam Pe2 in FIG. 2 contributes to the recording or reproducing of data on the recording medium C.

As shown in FIG. 2, the parallel effective beam Pe2 is centered on the optical axis and has an elliptical cross-section with a length D along the major axis direction J1 and a width W along the minor axis direction J2. The width W may be expressed as:

$$W=D/M,$$

where D is a diameter of the incident aperture 16*a* and M is a magnification of the beam-shaping prism 14 along the minor axis direction J2. It should be noted that the length of the parallel effective beam Pe2 along the major axis direction J1 and the diameter of the incident aperture 16*a* are substantially the same, since the beam shaping prism 14 does not expand a beam in the major axis direction J1.

In other words, it is only the parallel effective beam Pe2, i.e., a portion of the parallel beam P2 emitted from the collimating lens 12, which, after shaping by the beam-shaping prism 14, passes through the incident aperture 16*a* and the objective lens 15 to form the focused beam P4.

Figure 4:
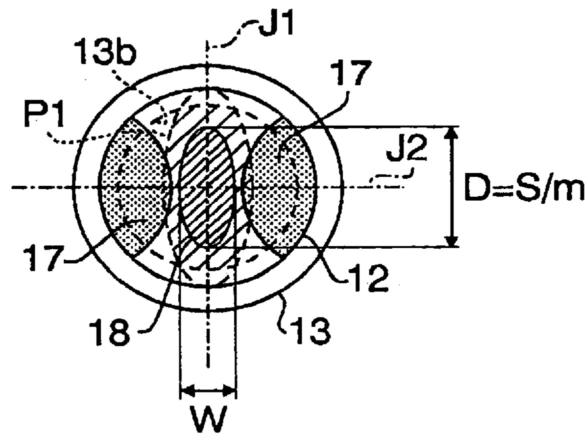
FIG. 4 is a schematic view taken along line II—II of FIG. 1, illustrating a relationship between a parallel light beam and an alternative arrangement of the adhesive applied to the collimating lens.

As shown in FIG. 2, the parallel beam P2 has a predetermined area on the incident surface 12*a* of the collimating lens 12. Thus, during assembly of the collimating lens 12 with the lens holder 13, the adhesive agent 17 is preferrably applied to the collimating lens 12 so that the adhesive agent 17 will not impinge on the parallel beam P2. However, since the volume and coefficient of viscosity of the adhesive agent 17 often changes due to environmental and temperature effects, such that the adhesive agent 17 spreads out, the adhesive agent 17 must be applied such that it will remain outside of an effective area 18 defined by the parallel effective beam Pe2 on the incident surface 12*a* of the collimating lens 12. Thus, during assembly of the collimating lens 12 with the lens holder 13, the adhesive agent 17 is applied to the collimating lens 12 so that the adhesive agent 17 will not impinge on the effective beam Pe2, i.e., outside of the effective area 18, even if the adhesive agent spreads, as shown in FIG. 4. With this structure, the focused beam P4 from the objective lens 15 will not be shaded or adversely affected by the adhesive agent 17.

It is preferable that, as shown in FIGS. 2 and 4, the adhesive agent 17 is applied at positions along the minor axis direction J2 of the effective beam Pe2, i.e., as far outside of the effective area 18 as possible. Thus, the adhesive agent 17 will not affect the optical pick-up from the recording medium C. Further, in order that the collimating lens 12 is held securely, the adhesive agent 17 may be applied symmetrically with respect to the optical axis of the collimating lens 12, as shown in FIG. 2 or FIG. 4.

Note that, other arrangements of the adhesive agent 17 are also possible, as long as the adhesive agent 17 is applied outside of the effective area 18, in particular, outside of a region, centered on the major axis direction J1, having the width W.

Figure 5:
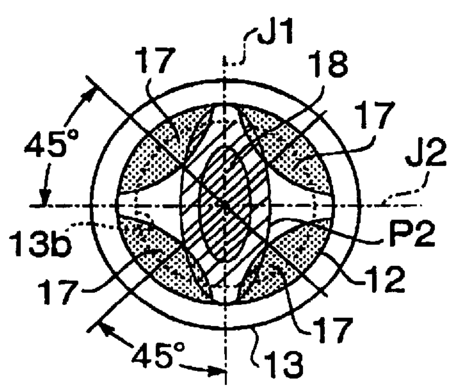
FIG. 5 is a schematic view taken along line II—II of FIG. 1, illustrating a relationship between a parallel light beam and another alternative arrangement of the adhesive applied to the collimating lens.
Figure 6:
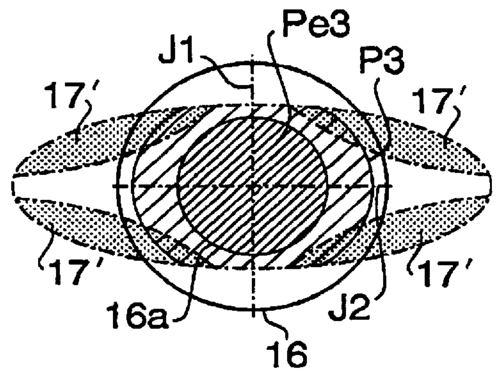
FIG. 6 is a schematic view taken along line I—I of FIG. 1, illustrating a relationship between the parallel light beam of FIG. 5 and an effective region of an objective lens.

For example, in order to more strongly support the collimating lens 12, the adhesive agent 17 may be applied at locations 45° from the major axis direction J1, as illustrated in FIGS. 5 and 6, while remaining outside of the effective area 18. The relationship between FIGS. 5 and 6 is similar to the relationship between FIGS. 2 and 3, and, therefore, a detailed description is omitted. Also in this case, the adhesive agent may be applied at locations symmetrically with respect to the optical axis of the collimating lens.

Furthermore, in the case that the adhesive agent 17 is applied to the emission surface 12*b* of the collimating lens 12, the adhesive agent 17 should be applied outside of a region, centered on the major axis direction J1, having the width W so that the adhesive agent will not interfere with the parallel effective beam Pe, and therefore, will not interfere with the optical pick-up from the recording medium C.

In any arrangement of the adhesive agent 17, it is important that the lens holder 13 supports the collimating lens 12 such that the applied adhesive agent 17 is appropriately positioned outside the effective area 18, especially with respect to the major and minor axis directions J1 and J2. Preferably, as shown in FIGS. 2, 4, and 5, the adhesive agent 17 is applied with symmetry to the optical axis of the collimating lens 12. Thus, the adhesive agent 17 can most effectively secure the collimating lens 12 in the lens holder 13.

Figure 7:
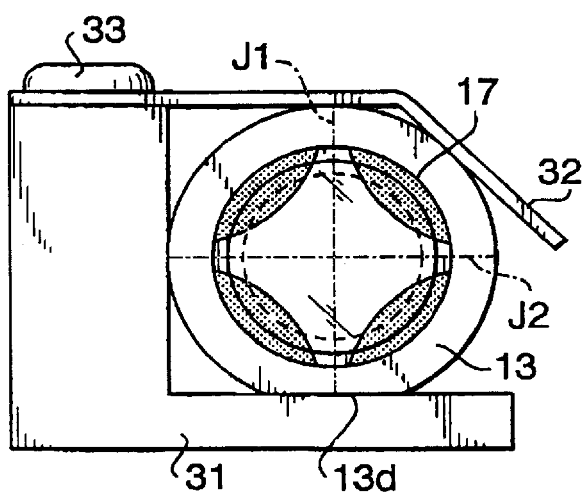
FIG. 7 is a plan view of a lens holder unit.

As shown in FIG. 7, using, as an example, the case in which the adhesive agent 17 is positioned at locations 45° with respect to the major and minor axis directions J1 and J2, the lighting portion 10 further includes a base 31 which supports the lens holder 13, a clasp 32 which clasps the lens holder 13, and screws 33 which secure the clasp 32 to the base 31.

Figure 8:
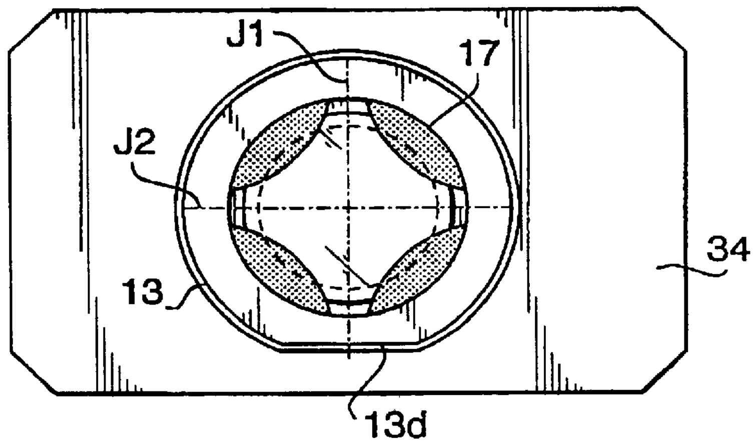
FIG. 8 is a plan view illustrating the application of the adhesive agent to the collimating lens.
Figure 9:
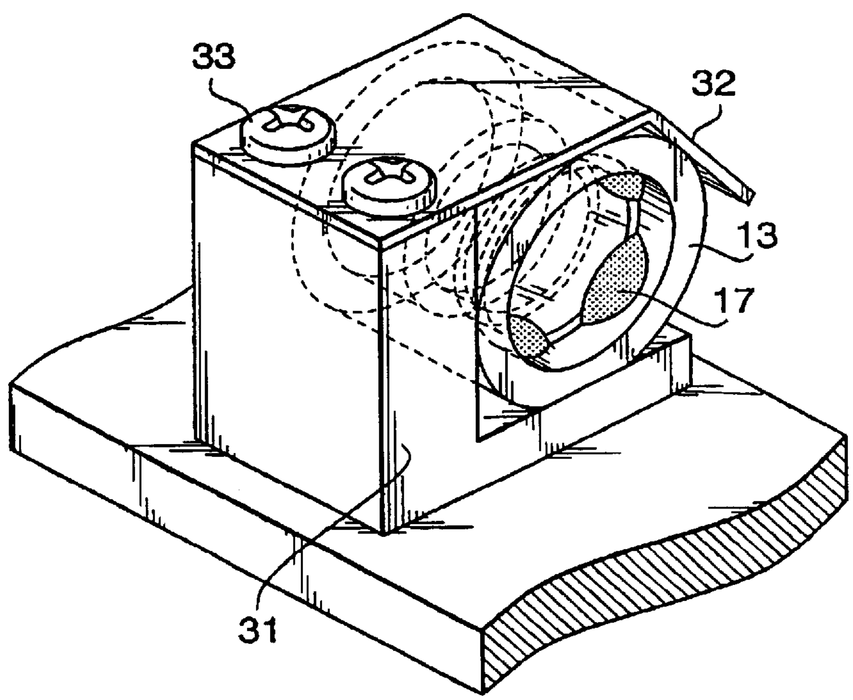
FIG. 9 is a perspective view of the lens holder unit.

Preferably, as shown in FIGS. 7 and 8, the outer surface of the lens holder 13 is provided with a flat portion 13d. With this arrangement, as shown in FIG. 8, the lens holder 13 may be placed in a separate case 34, which is not an element of the optical pick-up device 100, such that the major and minor axis directions J1 and J2 are defined based on the flat portion 13*d*, and the adhesive agent 17 may be quickly and easily applied outside of the effective area 18. Then, as shown in FIG. 7, the lens holder 13 can be quickly and easily mounted while maintaining an appropriate orientation of the major and minor axis directions J1 and J2 by placing the flat portion 13*d* on the base 31. FIG. 9 shows a perspective view of the lens holder 13 as assembled on the base 31.

With an arrangement according to the embodiment described above, since the adhesive agent 17 is applied at predetermined locations on the collimating lens 12 that are outside of the effective area 18 defined by the incident aperture 16*a* of the objective lens 15, the adhesive agent 17 does not interfere with or shade the focused beam P4 that is incident on the recording medium C.

Furthermore, in the case in which the adhesive agent 17 is applied at locations at an angle of 45° from the major and minor axis directions J1 and J2 and outside of the effective area 18, the collimating lens 12 can be securely supported while ensuring that the adhesive agent 17 does not interfere with the focused beam P4 that forms the beam spot on the recording medium C.

Although the structure and operation of a collimating lens unit is described herein with respect to the preferred embodiments, many modifications and changes can be made without departing from the spirit and scope of the invention.

The present disclosure relates to subject matter contained in Japanese Patent Application No. HEI 08-189178, filed on Jul. 18, 1996, which is expressly incorporated herein by reference in its entirety.

What is claimed is:

1. A collimating lens unit for use in an optical system, said collimating lens unit comprising:

- a collimating lens which receives a light beam and collimates said light beam into a parallel beam, said optical system defining an effective portion of said light beam collimated by said collimating lens;
- a lens holder supporting said collimating lens; and
- a fixing element which fixedly secures said collimating lens in said lens holder, said fixing element acting on said collimating lens outside of an effective area corresponding to said effective portion.

2. The collimating lens unit according to claim 1, wherein said light beam has an elliptical cross section.

3. The collimating lens unit according to claim 1, wherein said effective area is an elliptical area on a surface of said collimating lens.

4. The optical system according to claim 3, wherein said fixing element acts outside said elliptical area, substantially along a minor axis of said elliptical area.

5. The optical system according to claim 3, wherein said fixing device acts outside a region, centered on a major axis of said elliptical area, having a predetermined width along a minor axis of said elliptical area.

6. The optical system according to claim 3, wherein said fixing element acts at positions substantially 45 degrees from a major axis of said elliptical area.

7. The collimating lens unit according to claim 1, wherein said fixing element acts on an incident surface of said collimating lens.

8. The collimating lens unit according to claim 1, wherein said effective area is defined at an emission surface of said collimating lens.

9. The collimating lens unit according to claim 1, wherein said effective area is defined at an incident surface of said collimating lens.

10. The collimating lens unit according to claim 1, wherein said fixing element comprises an adhesive agent.

11. The collimating lens unit according to claim 1, wherein said fixing element acts at positions symmetrically about an optical axis of said collimating lens.

12. An optical head for use in an optical data recording and/or reproducing system to emit a light beam having a predetermined cross-sectional shape, said optical head comprising:

a light source which emits a light beam;

a collimating lens which receives said light beam and collimates said light beam into a parallel beam;

a beam-shaping element which adjusts a shape of said parallel beam emitted from said collimating lens to form a beam-shaped beam;

an objective lens which receives a portion of said beam-shaped beam and focuses said portion of said beam-shaped beam onto an objective surface, said portion of said beam-shaped beam received by said objective lens defining an effective portion of said beam-shaped beam;

a lens holder that holds said collimating lens; and a fixing element which fixedly secures said collimating lens in said lens holder, said fixing element acting on said collimating lens outside of an effective area which corresponds to said effective portion of said beam-shaped beam.

13. The optical head according to claim 12, wherein said light beam emitted by said light source has an elliptical cross section defining a major axis, a minor axis and said effective area having an elliptical shape positioned on said major axis and said minor axis.

14. The optical head according to claim 13, wherein said beam-shaping prism magnifies said parallel beam collimated by said collimating lens only in a direction parallel to said minor axis.

15. The optical head according to claim 14, wherein said fixing element acts outside of said effective area along said minor axis direction.

16. The optical system according to claim 14, wherein said portion of said beam-shaped beam received by said objective lens has a circular shape having a diameter D, wherein said fixing device acts outside a region, centered on said major axis, having a predetermined width W which is expressed as follows:

$$W=D/M,$$

wherein M is a magnification of said beam shaping prism in said direction parallel to said minor axis.

17. The optical head according to claim 14, wherein said fixing element acts at positions 45 degrees from said major axis.

18. The collimating lens unit according to claim 12, wherein said fixing element comprising an adhesive agent.

19. The collimating lens unit according to claim 12, wherein said fixing element acts at positions symmetrically about an optical axis of said collimating lens.

20. The optical head according to claim 12, wherein said lens holder is formed with a flat portion on an outer circumferential surface thereof, and wherein said flat portion is abutted against a flat base of said optical head to adjust an orientation of said lens holder.

* * * * *

UNITED STATES PATENT AND TRADEMARK OFFICE

CERTIFICATE OF CORRECTION

PATENT NO. : 5,805,363

DATED : September 8, 1998

INVENTOR(S) : I. OKUDA et al.

It is certified that error appears in the above-identified patent and that said Letters Patent is hereby corrected as shown below:

On the cover page of the printed patent, paragraph [56] References Cited, column 2, line 4, insert the following:

---5,257,145 10/1993 Kanazawa et al. 359/819---.

Signed and Sealed this

Sixth Day of April, 1999

Attest:

Q. TODD DICKINSON

Attesting Officer

*Acting Commissioner of Patents and Trademarks*